E. SONNENBURG.
WHEEL EXTRACTOR.
APPLICATION FILED OCT. 1, 1921.
1,434,852.
Patented Nov. 7, 1922.
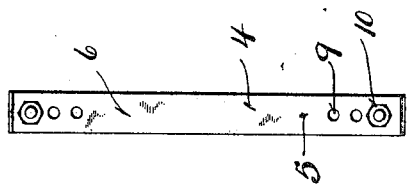
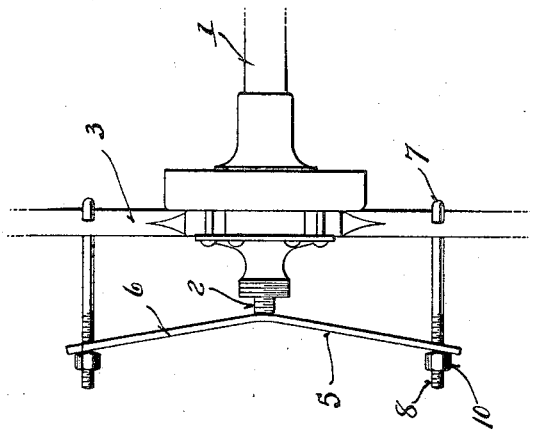

Patented Nov. 7, 1922.

1,434,852

UNITED STATES PATENT OFFICE.

EMIL SONNENBURG, OF CATO, WISCONSIN.

WHEEL EXTRACTOR.

Application filed October 1, 1921. Serial No. 504,542.

*To all whom it may concern:*

Be it known that I, EMIL SONNENBURG, a citizen of the United States, and resident of Cato, in the county of Manitowoc and State of Wisconsin, have invented certain new and useful Improvements in Wheel Extractors; and I do hereby declare that the following is a full, clear, and exact description thereof.

My invention relates to a new and improved wheel extractor of the type which may be used in connection with motor vehicles for removing the traction wheels from the rear axle thereof.

One of the important objects of the invention is to provide a device of this character which is so constructed that a single tool may be adapted for use in connection with practically any style or make of motor vehicles.

It is also an object of the invention to provide a tool of this kind which in addition to being adjustable to different sizes and types of wheels is comparatively simple and inexpensive to manufacture.

My invention is illustrated in the accompanying drawing, in which:—

Figure 1 is a side elevation of the invention applied to the wheel of a motor vehicle, and Figure 2 is a front elevation of the device.

In the drawing the numeral 1 indicates the axle housing of a motor vehicle from which the threaded end 2 of the axle projects. The spokes of the wheel are indicated at 3. My improved tool comprises a flat elongated strip 4 of spring steel which is preferably bent centrally to form two portions 5 and 6 which extend at a wide obtuse angle to each other. Two hooks 7 are provided which are adapted to engage oppositely extending spokes of the wheel and these hooks are provided with elongated shanks 8 which are threaded for a considerable portion of their length. The spring strip 4 is provided at each end with a plurality of holes 9, any one of which is adapted to receive the shank of a hook.

In the operation of my device the spring strip is disposed as shown in Figure 1 with the convex surface of its central portion engaging the end of the axle 2. The hooks 7 are engaged with the spokes and the nuts 10 are threaded onto the shanks to exert a tension on the spring strip which will gradually draw the wheel toward the end of the axle. The plurality of holes 9 permit the hooks to be adjusted to any size or type of wheel. The resilient nature of the spring strip is of particular advantage since it facilitates the gradual tightening of the nuts 10 and there is no tendency for the strip to break.

I claim as my invention:—

A wheel extractor comprising a flat elongated plate of spring metal adapted to bear centrally against the end of the axle, a hook for each end of the plate engageable with a spoke of the wheel and having its shank connected with the plate, the distance between the shank and the center of the plate being adjustable, and means for drawing the hooks toward the plate to force the wheel toward the end of the axle.

In testimony that I claim the foregoing I have hereunto set my hand at Cato, in the county of Manitowoc and State of Wisconsin.

EMIL SONNENBURG.